United States Patent [19]

Raidel

[11] 4,082,316
[45] Apr. 4, 1978

[54] MULTIPLE AXLE SUSPENSION WITH LOAD EQUALIZER BEAM

[76] Inventor: John E. Raidel, Rte. 9, Box 400-M, Springfield, Mo. 65804

[21] Appl. No.: 687,228

[22] Filed: May 17, 1976

Related U.S. Application Data

[62] Division of Ser. No. 555,393, Mar. 5, 1975.

[51] Int. Cl.² .............................................. B60G 5/04
[52] U.S. Cl. .................................... 280/681; 280/687; 267/63 R
[58] Field of Search ................ 280/681, 687, 104.5 A; 267/63 R

[56] References Cited
U.S. PATENT DOCUMENTS 3,471,165 10/1969 Raidel ................................... 280/687
3,792,871 2/1974 Chalmers ............................ 280/681

Primary Examiner—Philip Goodman
Attorney, Agent, or Firm—Rogers, Eilers & Howell

[57] ABSTRACT

A multiple axle suspension for vehicles has a first arm pivotally mounted at its rearward end from the vehicle chassis to suspend a first vehicle axle and a second arm pivotally mounted at its forward end from the vehicle chassis to suspend a second vehicle axle. A beam connects the first and second axles, either directly or by connecting the suspending arms. The forward end of the beam bears downwardly on the first axle or arm in opposition to that axle load, and the rearward end of the beam bears downwardly on the second axle or arm in opposition to that axle load. Resilient means are mounted between the vehicle chassis and the beam at a location between the axles. Other resilient means are mounted between the beam and the points where the beam joins the pivoting arms, if that configuration is used.

15 Claims, 11 Drawing Figures

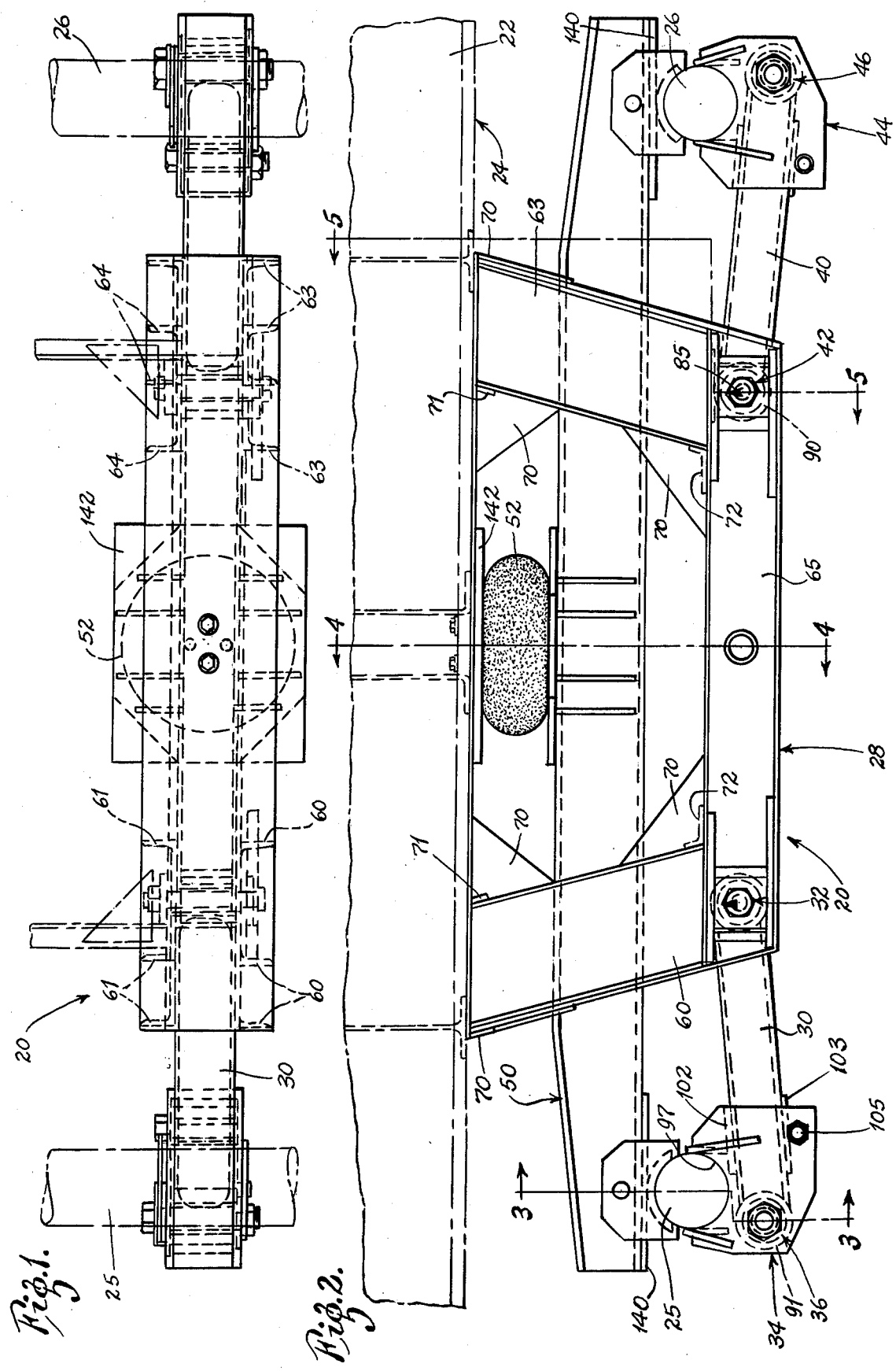

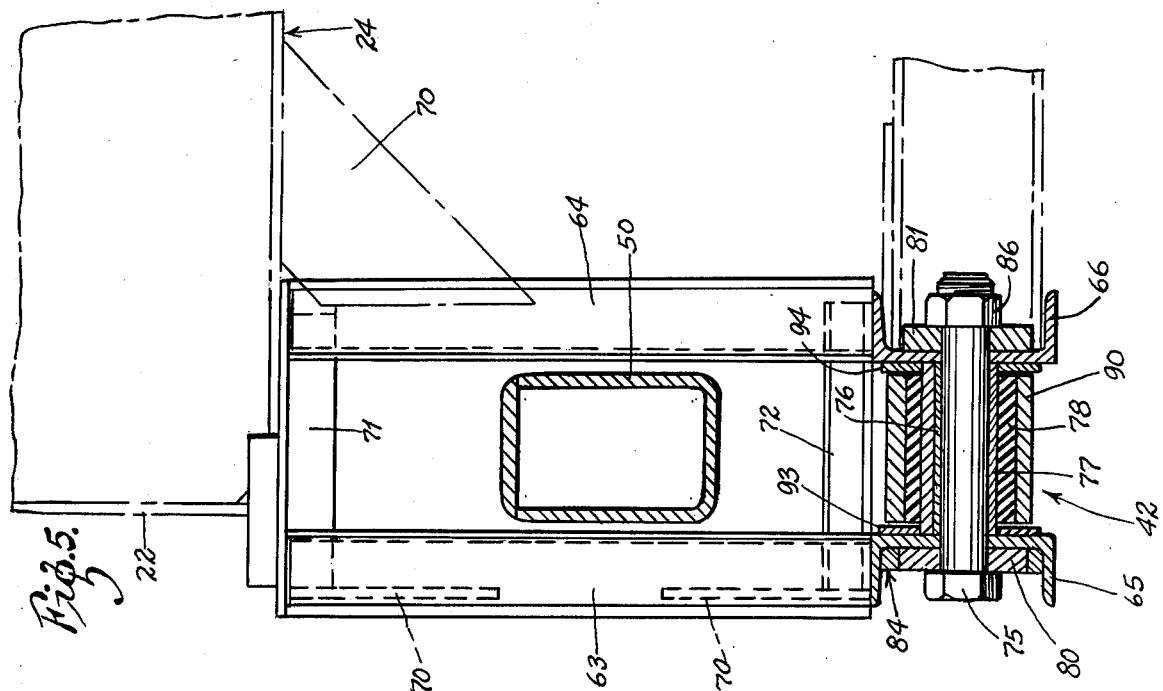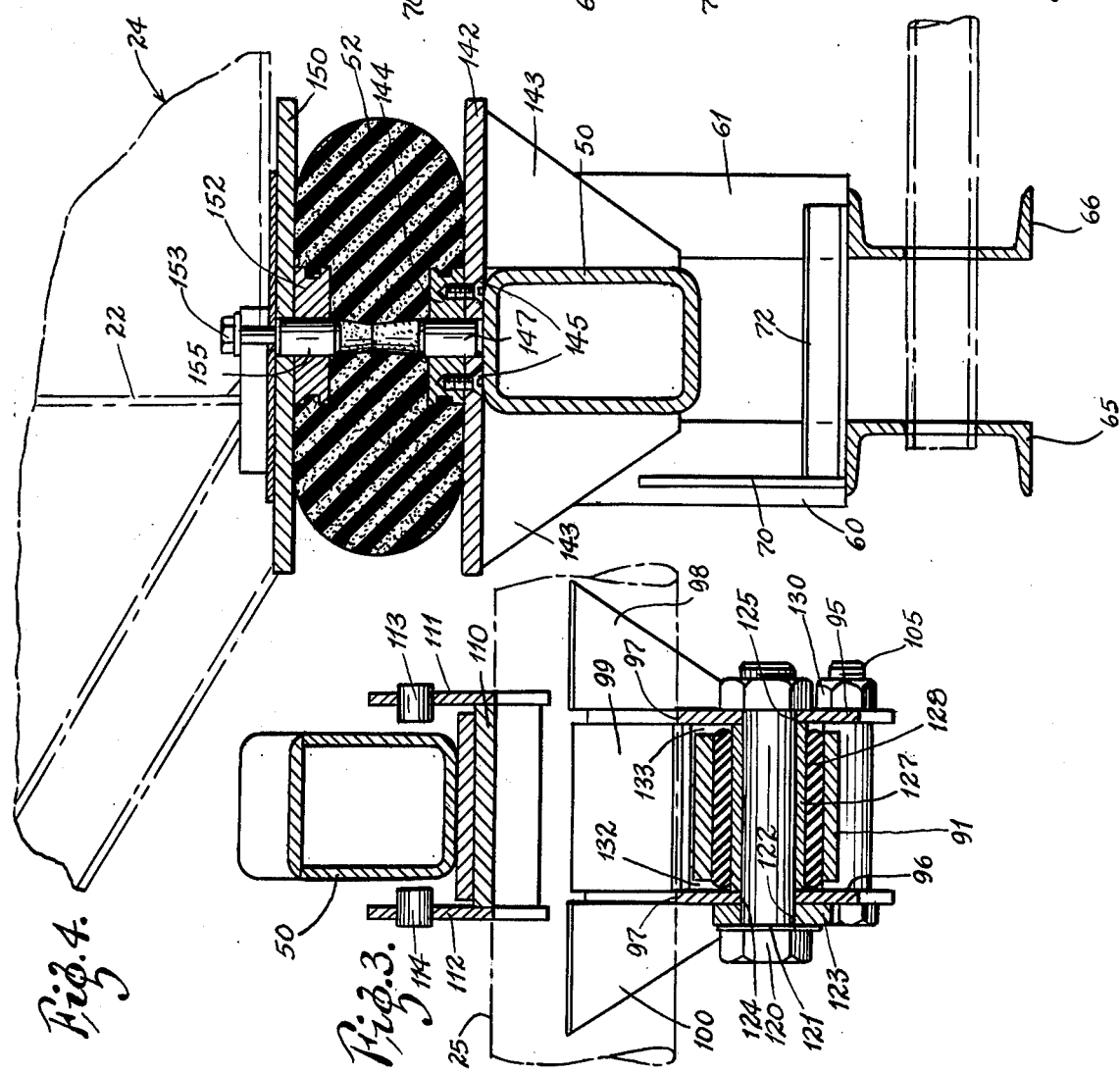

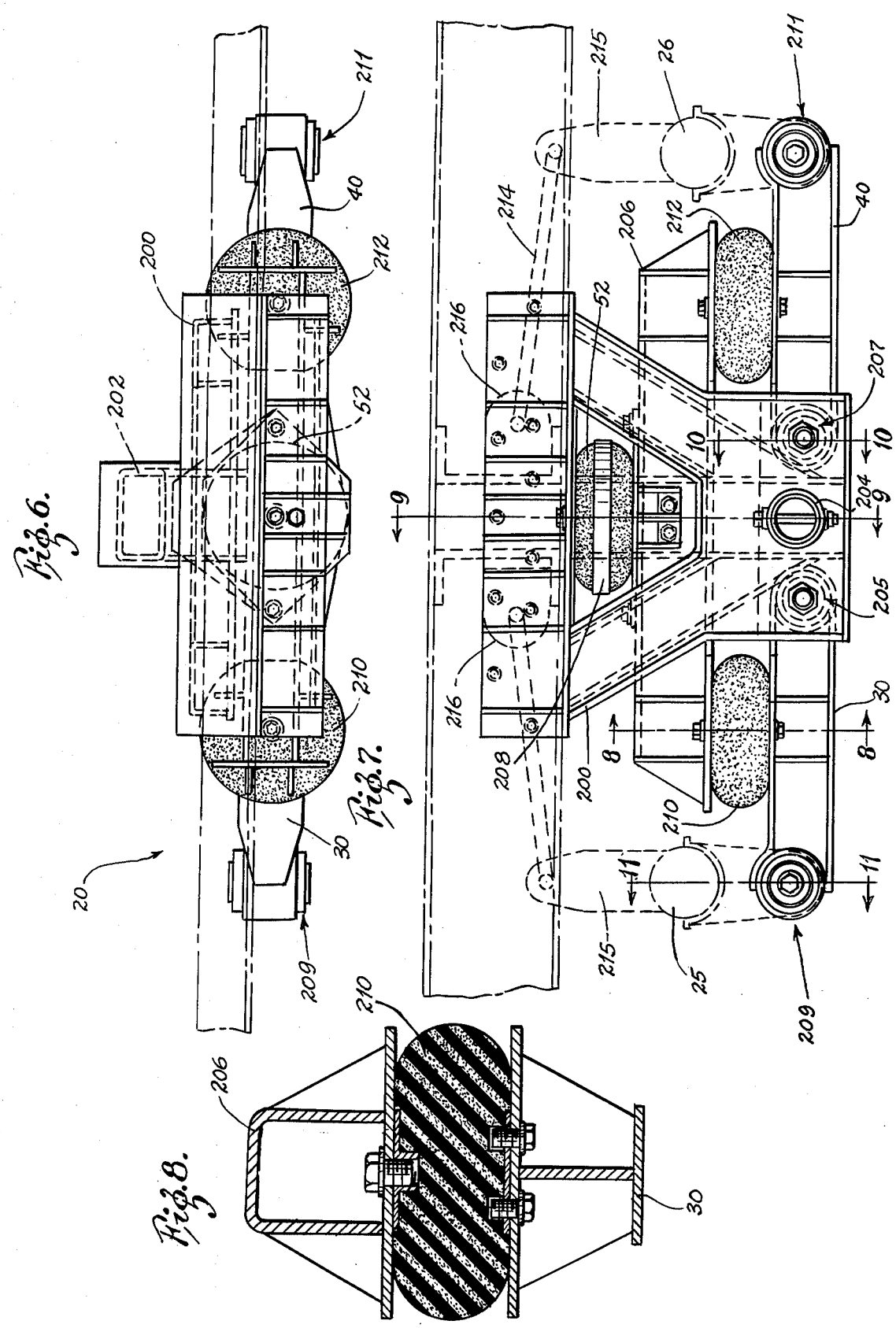

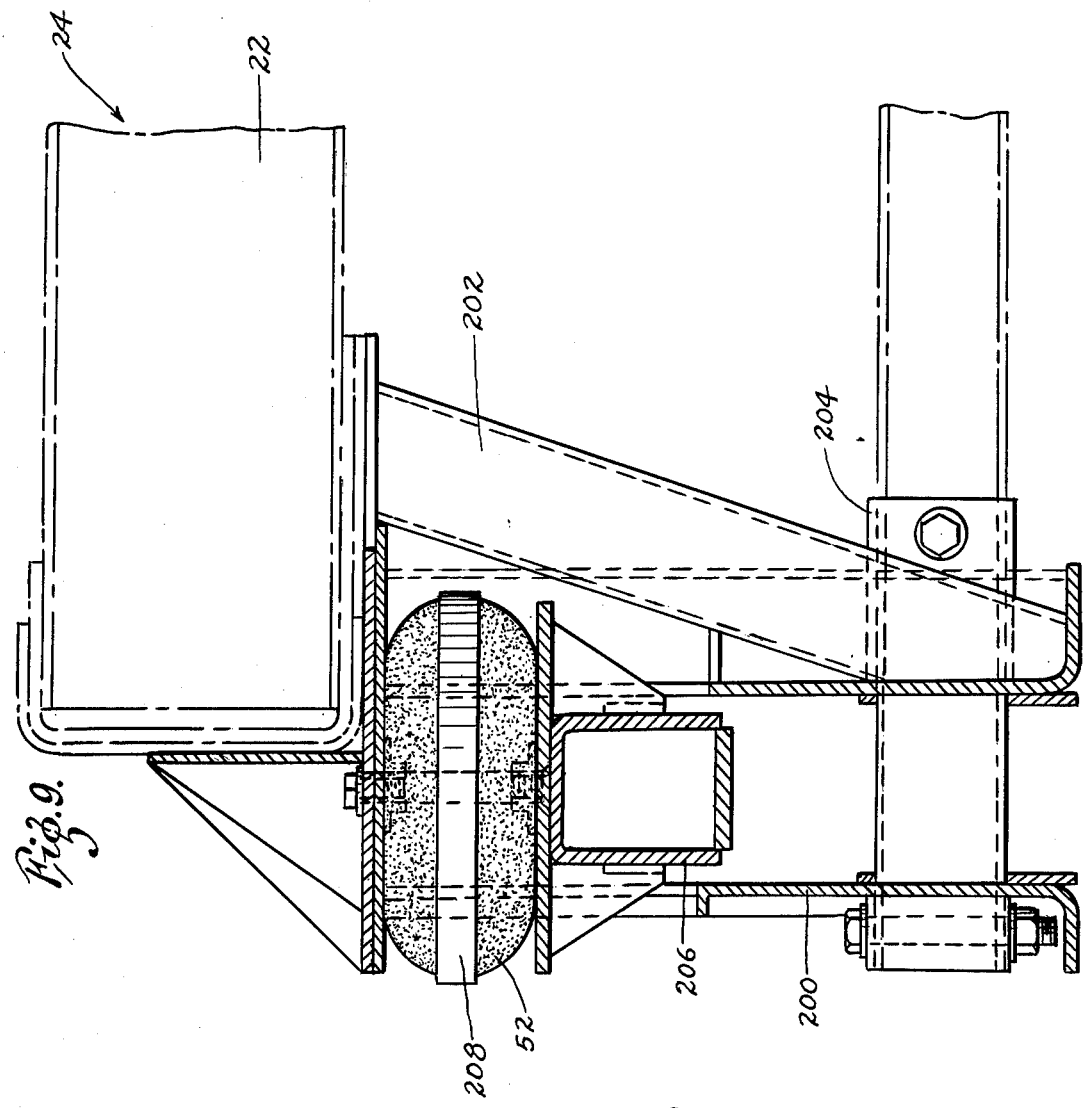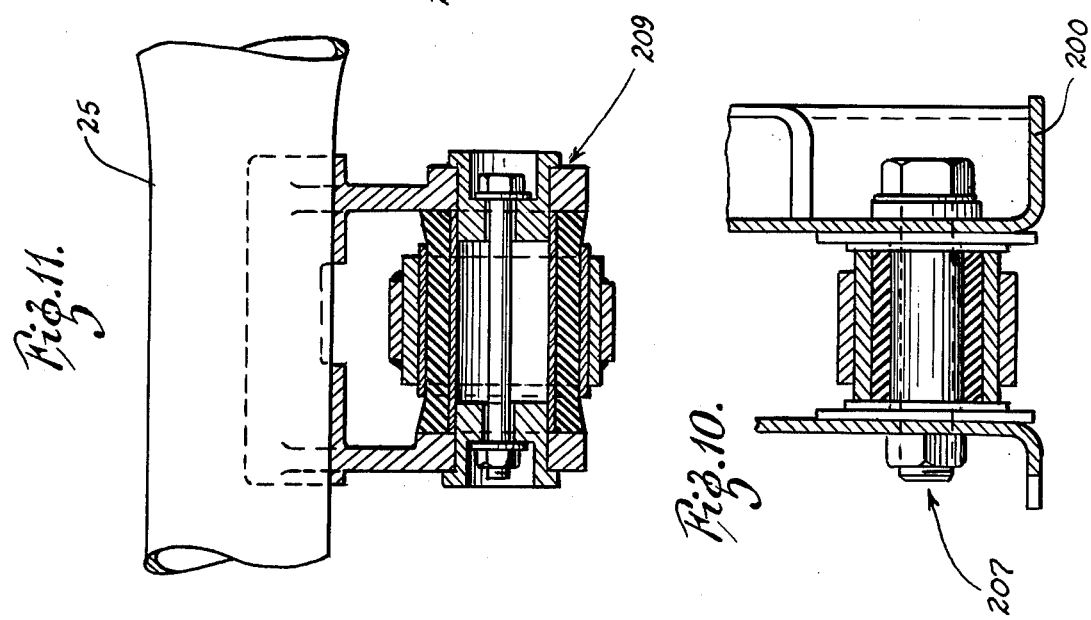

MULTIPLE AXLE SUSPENSION WITH LOAD EQUALIZER BEAM

This is a division, of application Ser. No. 555,393 filed Mar. 5, 1975.

BACKGROUND AND SUMMARY OF THE INVENTION

Previous multiple axle suspensions, for example those disclosed in U.S. Pat. No. 3,632,128, have means for mounting the axles for substantially independent movement to a vehicle chassis. These devices allow movement of the axles, and attached wheels, etc., in a vertical direction to allow the vehicle to track on all wheels as it transverses bumps or obstructions, and are adequate to do so.

Known suspensions have means to compensate for loading of each axle to distribute dynamic and static loads more evenly between the axles of the assembly, however, the suspension of this invention utilizes a load equalizing beam resiliently mounted to the vehicle chassis and mounted to move with the vehicle axles to provide unique and improved load distribution.

This invention relates to a multiple axle vehicle suspension assembly and particularly such an asembly wherein a resilient means may be utilized for resiliently supporting the load on the vehicle axles by means of a load equalizer beam that connects the axles to distribute the load therebetween.

The suspension assembly of this invention generally comprises a hanger mounted to and depending from the vehicle chassis, a first torque arm pivotally mounted by means of a resilient bushing at its rearward end to the hanger assembly with a forward vehicle axle mounted to its forward end. A second torque arm is pivotally mounted at its forward end by means of a resilient bushing to the hanger with a rear axle mounted to its rearward end. Thus, the first torque arm extends forwardly from the hanger with the forward axle mounted thereto, and the second torque arm extends rearwardly from the hanger with the rear axle mounted thereto.

A beam extends between the vehicle axles with the forward end of the beam opposing loading of the forward axle and the rearward end of the beam opposing loading of the rear axle. A resilient means, such as an elastomeric ball, is mounted between the beam and the vehicle chassis and attaches the beam to the vehicle chassis. As load is applied to one of the vehicle axles, it is transferred in part to the other axle and to the vehicle chassis through the elastomeric ball. Operation of the beam acts to equalize the load between the rear and forward axles.

In one preferred embodiment of the invention the forward and rear ends of the beam bear downwardly directly on the forward and rear axles of the vehicle. In another preferred embodiment of the invention, resilient means, such as elastomeric balls, are mounted between the axles or the pivot arms and the ends of the beam, to act along with the resilient means between the beam and the vehicle chassis in carrying the vehicle load.

Thus, it is a primary object of this invention to provide a multiple axle vehicle suspension which utilizes a load equalizer beam that spans the axles of the vehicle. The suspension has resilient means between the load equalizer beam and vehicle chassis to support at least a portion of the vehicle load and allow resilient rocking or pivoting of the vehcle load equalizer beam. The pivoting movement operates to distribute the load between the axles under conditions where one axle is loaded more heavily than the other.

DESCRIPTION OF THE DRAWINGS

FIG. 1 is a top plan view of a multiple axle suspension of this invention;

FIG. 2 is generally a side elevation view of the suspension assembly of FIG. 1;

FIG. 3 is an enlarged view in section taken generally along the line 3—3 of FIG. 2;

FIG. 4 is an enlarged view on section taken generally along the line 4—4 of FIG. 2;

FIG. 5 is an enlarged view in section taken generally along the line 5—5 of FIG. 2;

FIG. 6 is a top plan view of a modified suspension, similar to that shown in FIG. 1;

FIG. 7 is a side elevational view of the suspension of FIG. 6;

FIG. 8 is an enlarged sectional view taken along the plane of line 8—8 in FIG. 7;

FIG. 9 is an enlarged sectional view taken along the plane of line 9—9 in FIG. 7;

FIG. 10 is an enlarged sectional view taken along the plane of line 10—10 in FIG. 7; and FIG. 11 is an enlarged sectional view taken along the plane of line 11—11 in FIG. 7.

DETAILED DESCRIPTION OF PREFERRED EMBODIMENTS

Referring to the drawings, FIGS. 1-5 show a suspension 20 mounted to a side member 22 of a vehicle chassis 24 having chassis struts 24'. The axles 25 and 26 of the vehicle are mounted to the suspension below the vehicle chassis in a manner to be described.

It is to be understood that the suspension 20 is duplicated on both sides of the chassis 24 with the axles 25 and 26, as well as the vehicle chassis 24, being similarly connected at both sides. Because each side is identical, only a single side will be described. The suspension 20 is also symmetrical about a central vertical axis, as viewed in FIG. 2, forward motion of the vehicle can be considered as either to the left or right.

The principle components of the suspension 20 comprise an "A" frame hanger 28 suspended from the side member 22 of the chassis 24. A first torque beam 30 is pivotally attached at one end to the hanger 28 by means of a resilient bushing 32. The axle 25 is mounted to the free end of the torque beam 30 by means of an axle mounting bracket 34 and bushing assembly 36.

Another torque beam 40 has one end pivotally connected to the hanger assembly 28 by means of a resilient bushing assembly 42. The torque beam 40 extends in an opposite direction from the torque beam 30. The vehicle axle 26 is mounted to the free end of the torque beam 40 by means of an axle mounting bracket 44 and bushing assembly 46.

A load equalizing beam 50 extends between the axles 25 and 26 with the ends of the beam 50 bearing downwardly on the axles, as shown. An elastomer ball 52 is mounted between the beam 50 and vehicle chassis midway between the ends of the beam 50.

It will be noted that the suspension assembly 20 is symmetrical about a central vertical axle designated as the line 4—4 in FIG. 2. The bushing assembly 32 is identical to the bushing assembly 42, the bushing assembly 36 is identical to the bushing assembly 46, the torque beam 30 is identical to the torque beam 40, and the axle mounting bracket 34 is identical to the axle mounting bracket 44. Therefore, only one of each of these like components will be described.

The hanger 28 comprises a first pair of depending rails 60 and 61 and a second pair of depending rails 63 and 64 attached at their tops to the vehicle chassis 24, e.g., by welding. Each rail is of generally U-shaped cross section, and the rails in each set of rails are spaced sufficiently far apart to allow for vertical pivoting movement of the beam 50 therebetween as the load on the vehicle axles varies. A cross rail 65 is attached at its ends to the bottoms of the rails 60 and 63, and a rail 66 is attached at its ends to the bottom of the rails 61 and 64 parallel to rail 65. The rails 65 and 66 are of generally U-shaped cross section and oriented generally horizontally. The rails 65 and 66 are spaced apart a sufficient distance to allow for vertical pivotal movement of the torque beams 30 and 40 therebetween for purposes to be described. Gussets 70 are provided to add support to the hanger 28, and upper cross support plates 71 and lower cross support plates 72 are further provided for the same purpose.

The bushing assemblies 32 and 42 are generally of a type fully disclosed in U.S. Pat. No. 3,751,063 and specifically are best shown in FIG. 6 of that patent. A similar bushing assembly is shown in and described in U.S. Pat. No. 3,794,344, and are best shown in FIG. 5 of that patent. Thus, the bushing assemblies 32 and 42 (FIG. 5) each includes a bolt 75 which extends through holes in the rails 65 and 66, a cam member 76 on the shank of the bolt which acts as an eccentric, a metal sleeve 77 which surrounds the shank of the bolt 75 and eccentric 76, and a rubber bushing 78 which surrounds and is bonded to the sleeve 77. Plates 80 and 81 are located at opposite ends of the bolt 75 outside the rails 65 and 66, with the plate 80 surrounded by a frame 84 to prevent rotation of the plate 80. An arrow 85 is drawn or stamped on the face of the bolt head and points to the central high rise of the cam eccentric 76. The purpose of the eccentric bolt is to provide means for aligning the axle in the manner described in U.S. Pat. No. 3,510,149. A nut 86 is used to tighten the bushing assembly 32 or 42 in place.

The torque beams 30 and 40 are tubular and terminate at their one end in a sleeve member 90 and at their other end in a sleeve member 91. The sleeve member 90 surrounds the rubber bushing 78 of the bushing assembly 32 of 42 for pivotal movement thereabout. Metallic washers 93 and 94 surround the sleeve 77 and are located at opposite ends of the bushing 78 and the sleeve member 90 to provide a relatively tight fit of the sleeve 90 between the rails 65 and 66. This prohibits any appreciable movement of the sleeve 90 back and forth between the rails 65 and 66, and prohibits any appreciable rotation of the torque beams 30 and 40 about their longitudinal axes to insure maintenance of proper wheel tracking and alignment as the vehicle rounds corners and the like.

The sleeve member 91 at the other end of the torque beams 30 and 40 is mounted to the axle bracket 34 or 44 by means of the bushing assembly 36 or 46. The axle brackets 34 and 44 each comprise spaced vertical plates 95 and 96 which straddle the torque beam 30 and 40. Each of the plates 95 and 96 has a semi-circular shaped recess 97 of approximately the same radius as the axle 25 or 26. The axle is secured in the semi-circular shaped recesses 97, e.g., by welding. To add side rigidity to the axle mount 34 or 44, on each side of the axle there are reinforcing plates 98, 99 and 100 which are mounted outside the vertical plates 95 and 96 and are secured at their lower sides to the plates 95 and 96, and at their top to the axle also by welding. Thus, the axle brackets 34 and 44 provide very rigid and secure supports for the axles on the torque beams 30 and 40.

Also mounted between the vertical parallel plates 95 and 96 are stop plates 102 and 103, each oriented generally parallel to the longitudinal axis of the torque beam 30. The stop plate 102 is located above the beam 30 and is secured such as by welding at its sides to the plates 95 and 96 and at its top to the axle also by welding. Thus, the axle brackets 34 and 44 provide very rigid and secure supports for the axles on the torque beams 30 and 40.

Also mounted between the vertical parallel plates 95 and 96 are stop plates 102 and 103, each oriented generally parallel to the longitudinal axis of the torque beam 30. The stop plate 102 is located above the beam 30 and is secured such as by welding at its sides to the plates 95 and 96. A support pin 105 extends between the plates 95 and 96 just beneath the plate 103 to add further support to the plate. The plates 102 and 103 are mounted at a location between the ends of the torque beam 30 or 40 such that the plate 102 bears downwardly on the torque beam under axle load. The purposes of the plates 102 and 103 are to prevent any tendency for the axle to rotate when the brakes are applied with the vehicle moving in the forward or reverse direction, to support the axle under load, and to reinforce the axle bracket.

A bearing pad 110, having side members 111 and 112, is welded to the top side of each axle 25 and 26. Pins 113 and 114 are mounted to the side members 111 and 112, respectively, to limit side movement of the load equalizing beam 50 as will be further explained.

The bushing assemblies 36 and 42 are located between the vertical parallel plates 95 and 96 and each includes a bolt 120, the shank of which passes through a washer 121, a hole 122 in a plate 123, a hole 124 in the plate 96, and a hole 125 in the plate 95. A sleeve 127 surrounds the shank of the bolt between the plates 95 and 96, and a rubber bushing 128 surrounds the sleeve 127. The sleeve member 91 of the torque beams 30 and 40 surrounds the rubber bushing 128. A nut 130 is secured to the threaded end of the bolt 120 to hold the bushing assembly 36 or 46 in place. It will be noted that there are no washers in the bushing assembly 36 or 46 such as the washers 93 and 94 in the bushing assembly 32 and 42, leaving spaces 132 and 133 between the ends of the sleeve 91 and the plates 96 and 95. This permits oscillation of the axle about the longitudinal axis of the torque beam as where one end of the axle moves up or down under load with respect to its other end, all of which is fully described in U.S. Pat. No. 3,794,344 incorporated herein by reference.

The load equalizing beam 50 is of generally rectangular cross section and extends between the axles 25 and 26 as best shown in FIG. 2. Plates 140 are mounted beneath the beam 50 at each of its ends and bear downwardly on the bearing pads 110.

The elastomeric ball 52 is mounted at its lower side to the beam 50 by means of a generally horizontal lower mounting plate 142, which in turn is secured to the beam 50 by means of welding and further supported by means of gussets 143. The ball 52 has an insert 144 which has threaded holes for receiving flat head screws 145 for mounting the ball 52 to the plate 142. A dowel pin 147 extends through a hole in the insert and a hole in the plate 142 to further secure the ball 52 against side movement relative to the plate 142.

The ball 52 is mounted at its top to the vehicle chassis 24 by means of an upper mounting plate 150. The ball 52 includes an upper insert 152 having threaded holes to receive bolts 153 for mounting the ball to the chassis. A dowel pin 155 extends through a hole in the insert 152 and a hole in the plate 150 to add further support against side movement of the ball relative to the chassis.

It should be noted that while only one ball 52 is shown, more than one such ball could be used. For example, a plurality of elastomeric balls could be placed side by side, each centered on the axis 4—4 of FIG. 2.

FIGS. 6 through 11 disclose a modified device similar to that shown in FIGS. 1 through 5. In the modified device an A-frame 200 is attached to side member 22 of a vehicle chassis 24, and a suspension member 20 is mounted in the A-frame 200. The A-frame 200 is stabilized by a supporting strut member 202 and by transverse support tube 204 which is connected between the base of the A-frame 200 and attached to an adjacent parallel suspension A-frame (on the opposite side of the vehicle). Extending outwardly at the base of the A-frame 200 are opposed torque beams 30 and 40 which pivot about mounts 205 and 207 similar to those previously described for the embodiment of FIG. 1. The outwardmost ends of torque arms 30 and 40 terminate in bushing assemblies 209 and 211 similar to those described, which are attached to axles 25 and 26 by mounting means shown in more detail in FIG. 11. The mounting means of FIG. 11 and the bushings are identical to that disclosed in U.S. Pat. No. 3,632,128 incorporated herein by reference.

Load equalizer beam 206 similar to load equalizer beam 50 is mounted to the vehicle chassis by a resilient elastomer ball 52 mounted between the beam 206 and the vehicle chassis midway between the ends of the beam 206, as previously described for beam 50. It will be noted that, as shown in FIG. 7, resilient elastomer ball 52 has an enclosing or encircling steel belt 208 to increase the rigidity and stiffness of the spring action of elastomer ball 52. Belt 208 may be used or not depending on the particular rigidity of spring action desired.

The ends of beam 206 are not directly connected to the axles 25 and 26, as in the previous embodiment, but are indirectly connected via the torque beams 30 and 40. Resilient balls 210 and 212 attach the ends of beam 206 to torque arms 30 and 40, as shown in FIGS. 7 and 8. Resilient balls 210 and 212 may also have an encircling steel belt, similar to belt 208, if desired.

Radius rods 214 are pivotally connected between brackets 215 and 216, the brackets 215 being welded to centers of the axles 25 and 26, and the brackets 216 being bolted to the centers of the frame cross members. These radius rods (shown in broken lines) are conventional to stabilize the axles at all times.

The components of the modified device described herein are, of course, reinforced to provide the desired physical strength by incorporating additional strengthening and stiffening members, webs and thickened portions as previously described for the embodiments shown in FIGS. 1 through 5 and as shown in FIGS. 6 through 11. These components are not described herein in detail for the embodiments shown in FIGS. 6 through 11 but their purpose and function will be appreciated from the foregoing descriptions for the embodiment shown in FIGS. 1 through 5.

OPERATION OF THE DEVICE

As the axles 25 and 26 are evenly loaded, the chassis 24 bears downwardly on the top of the elastomeric ball 52, the torque arms 30 and 40 pivot about the bushing assemblies 32 and 42 in an upward direction, and the opposite ends of the beam 50 bear downwardly on the axles 25 and 26 such that the center of the beam 50 bears upwardly on the bottom of the elastomeric ball 52. This will cause the ball 52 to flatten under load.

If one of the axles becomes more heavily loaded than the other, such as the axle 25 becoming more heavily loaded than the axle 26, this will cause the torque beam 30 to pivot upwardly about the bushing assembly 32 which will cause the left end (as viewed in FIG. 2) of the beam 50 to move upwardly. With the center of the beam 50 supported by the ball 52 and acting as a fulcrum, the right end bears downwardly on the axle 26 thereby transferring a portion of the load from the axle 25 to the axle 26 and tending to equalize the loads on the axles.

The side plates 111 and 112 and limit pins 113 and 114 limit side movement of the beam 50 to hold it in bearing contact with the bearing pad 110. The stop plates 102 and 103 are mounted against the top and bottom sides of the torque beams 30 and 40 to prevent any rotation of the axles 25 and 26 under load or under braking of the vehicle with the vehicle moving in either the forward or reverse direction. The bushing assemblies 36 and 46 provide means for resiliently mounting the torque beams 30 and 40 to the axle mounting brackets 34 and 44, and also, through the spacings 132 and 133, allow limited oscillation of the axles 25 and 26 about the longitudinal axes of the torque beams 30 and 40 such as where one end of the axle moves up or down relative to its other end.

The operation of the modified device shown in FIGS. 6 through 11 is similar to the operation of the device shown in FIGS. 1 through 5 as previously disclosed. The beam 206 operates to distribute the load between torque beams 30 and 40 and thereby through the torque beams 30 and 40 to axles 25 and 26, substantially in the manner previously described. If axle 25 becomes more heavily loaded than axle 26, this will cause torque beam 30 to pivot upwardly about bushing assembly 205 and, as a consequence, will force resilient elastomeric ball 210 upwardly and thereby force the left end of beam 206 upwardly (as shown in FIG. 7). The center of beam 206 is supported on elastomeric ball 52, which acts as a fulcrum, and as a consequence the right end of beam 206 will bear downwardly on elastomeric ball 212 which will bear downwardly on torque arm 40. Torque arm 40 thereby bears downwardly on axles 26 and a portion of the load from axle 25 is thereby transferred to axle 26, thereby tending to equalize the loads on the axles.

Thus, there has been described a multiple axle vehicle supsension assembly wherein resilient means may be utilized for resiliently supporting the load on the vehicle axles by means of a load equalizer beam to distribute the load therebetween.

It will be appreciated by one skilled in the art that many modifications and changes may be made in the device as disclosed without departing from the concepts of the invention. It is intended that the foregoing description is given for purposes of illustration only and the invention is to be limited only by the scope of the appended claims.

I claim:

1. A suspension assembly for a vehicle comprising a first arm, means for pivotally mounting one end of said first arm from the vehicle chassis, means for mounting a vehicle axle at the other end of said first arm, a second arm, means for pivotally mounting one end of said second arm from the vehicle chassis, means for mounting another vehicle axle at the other end of said second arm, a beam extending over said first and second arms, the ends of the beam being attached to the arms at an intermediate location between the chassis mount points and the axles, one end of the beam being attached for movement with one of said arms, and the other end of the beam being attached for movement with the other of said arms, and resilient means mounted above the beam and between the beam and vehicle chassis and between the beam and said arms and attaching the beam to the vehicle chassis and the arms to resiliently support the axle load.

2. The suspension of claim 1 wherein the resilient means comprises at least one elastomeric ball between the beam and the chassis and at least one elastomeric ball between the beam and each arm.

3. The suspension assembly of claim 1 wherein the resilient means between the beam and the vehicle chassis is mounted midway between the axles.

4. The suspension assembly of claim 1 wherein the resilient means includes at least one elastomeric ball.

5. The suspension of claim 4 wherein at least the resilient means between the beam and the vehicle chassis has means to increase the stiffness of the ball.

6. The suspension assembly of claim 1 wherein the pivotally mounting means further comprises a hanger assembly depending from the vehicle chassis, and means for pivotally mounting said arms to the hanger assembly with one arm extending generally forwardly therefrom and the other arm extending generally rearwardly therefrom.

7. The suspension assembly of claim 6 wherein said beam extends over the pivotally mounting means.

8. The suspension assembly of claim 1 wherein each of the pivotally mounting means further comprises a bushing assembly having resilient bushing means therein.

9. The suspension assembly of claim 1 including stop means associated with each axle movement and which bear against the arms to prevent rotation of the axle when the brakes are applied.

10. The suspension assembly of claim 9 further comprising an axle mounting bracket for each axle, resilient bushing means for mounting the other ends of the arms to the axle mounting brackets, the axle mounting brackets including members that bear against the arms as the vehicle brakes are applied, the axles being mounted to the axle mounting brackets.

11. The suspension assembly of claim 1 including means permitting oscillation of said vehicle axles relative to the chassis as occurs where one end of the axle moves up or down relative to its other end.

12. The suspension assembly of claim 1 including means associated with the pivotally mounting means of the arms for aligning the axles.

13. A suspension assembly for a vehicle comprising a hanger assembly depending from the vehicle chassis, a first arm, a first resilient bushing means for mounting one end of the first arm to the hanger assembly with the first arm extending generally forwardly therefrom, means for mounting a vehicle axle to the other end of said first arm, a second arm, resilient bushing means for mounting one end of said second arm to the hanger assembly with said second arm extending generally rearwardly therefrom, means for mounting another vehicle axle to the other end of said second arm, a beam extending over said arms above the resilient bushing means, means for mounting one end of said beam to one of said arms for movement therewith, and means for mounting the other end of said beam to the other of said arms for movement therewith, and resilient means mounted above the beam and between the beam and the vehicle chassis and between the beam and said arms and attaching the beam to the vehicle chassis and the arms to resiliently support the axle load.

14. The suspension assembly of claim 13 wherein the resilient means between the beam and vehicle chassis is symmetrical about a vertical axis midway between the ends of the beam.

15. The suspension assembly of claim 13 wherein the resilient means comprise solid elastomeric balls.

* * * * *